3,079,301
9α-HALO - 1,4,6 - PREGNATRIENES AND THERA-
PEUTIC COMPOSITIONS CONTAINING SAME
David H. Gould, Leonia, and Hershel L. Herzog, Mountain View, N.J., assignors to Schering Corporation, Bloomfield, N.J., a corporation of New Jersey
No Drawing. Filed Apr. 25, 1956, Ser. No. 580,475
12 Claims. (Cl. 167—77)

The present invention relates to a process for the manufacture of new 1,4,6-pregnatriene-21-ol-3,20-diones and their esters, and to the compounds obtained thereby.

This application is a continuation-in-part of our copending application Serial No. 513,901, filed June 7, 1955.

The invention relates in particular to the manufacture of 9α-halo-1,4,6 - pregnatriene-17α,21 - diol-3,20-diones having a β-hydroxyl or ketonic oxygen at the 11-position, and of certain derivatives of these compounds. The compounds of our invention are characterized by adrenocortical hormone activity, and particularly by an antiinflammatory glucocorticoid and mineralocorticoid activity which is generally superior to that of cortisone, so that they are useful in the treatment of adrenal deficiencies, inflammatory disorders and certain collagen diseases. They are suitable also for use as intermediates for the manufacture of known pregnadiene compounds having adrenocortical activity, as will be explained hereinbelow, and of new pregnatetraenes as described and claimed in the copending application of Gould, Hershberg and Shapiro, Serial No. 559,514, filed January 17, 1956, now abandoned in favor of a continuing application, now United States Patent No. 2,864,835.

The present invention provides a process for introducing one, two, or three double bonds into the corresponding 1,4-pregnadiene, 4-pregnene and saturated pregnane compounds, respectively, to produce 1,4,6-pregnatrienes. The starting compounds may be, for example, the 17α, 21-dihydroxy-3,20-diketo pregnanes having a keto or hydroxyl group at the 11-carbon or a 9,11-oxido group, and the corresponding 4-pregnenes and 1,4-pregnadienes, and the esters of these compounds.

The cortical hormone activity of the pregnatrienes of our invention is quite surprising in view of the fact that none of the known steroid adrenal hormones is triply unsaturated; and, moreover, it is known that 6-dehydrocortisone and 6-dehydrocortisol are of a reduced order of activity as adrenocortical hormones, whereas the corresponding 1,4,6-trienes have at least in certain respects higher activity than cortisone and hydrocortisone, as will be explained more fully hereinbelow.

When not originally produced from the corresponding known 1,4-dienes, the trienes of our invention can, if desired, be converted to the dienes by limited and selective reduction at the 6,7-double bond. Thus, 1,4,6-pregnatriene-17α,21 - diol - 3,11,20-trione and 1,4,6-pregnatriene-11β,17α,21-triol-3,20-dione and their esters can be reduced to the known highly active 1,4-pregnadiene-17α,21-diol-3,11,20-trione and 1,4-pregnadiene-11β,17α, 21-triol-3,20-dione (1-dehydrocortisone and 1-dehydrocortisol) and their esters.

The compounds of our invention include 9α-halo-1,4,6-pregnatriene-11β,17α,21 - triol-3,20-dione, 9α-halo-1,4,6-pregnatriene - 17α,21 - diol-3,11,20-trione, the halo group being fluorine, chlorine or bromine, and also the 21-esters of all of these trienes esterified or not at the 11-position (in the case of the 11-hydroxy compounds), including the esters of lower fatty acids, especially the acetates, but including the formates, propionates, butyrates, valerates, isovalerates, as well as the hemi-succinates, malonates and maleates, and also the esters of glycollic, citric, tartaric and aminoacetic acids; and of cycloaliphatic acids, like cyclopentyl and cyclohexyl carboxylic, acetic and propionic acids and hexahydrophthalic acid; and of aryl carboxylic acids, like the benzoates, salicylates, veratrates and phthalates; and the condensation products of these keto-alcohols and keto-esters with ketone reagents of the amine type, including the semicarbazones, thiosemicarbazones, hydrazones and oximes; and also the 3-cycloketal and 3-acetal derivatives, as the ethylene and 1,2-propylene glycol ketals of the specific trienes named above, and produced by known methods, and when the 21-hydroxyl is free, also the 3,20-bis-ketals.

Longer-acting esters of 1,4,6-pregnatriene-17α,21-diol-3,11,20-trione, 1,4,6-pregnatriene - 11β,17α,21-triol-3,20-dione and their 9α-halo (i.e., fluoro, chloro and bromo) derivatives may be obtained by converting these compounds into their 21-esters of the following acids: cyclohexanecarboxylic acid, 4 - methylcyclohexanecarboxylic acid, 3-ethyl-cyclohexylacetic acid, cyclohexylpropionic acid, cyclopentyl propionic acid, phenylacetic acid, trimethylacetic acid, t.butylacetic acid, butoxybutyric acid, ethoxy-caproic acid, methylthiovaleric acid, isopropylthioacetic acid, phenylthioacetic acid, caproic acid, isobutyric acid, enanthic acid, isoaprylic acid, cyclohexylcaproic acid, undecylenic acid, 2-ethylbutyric acid, toluic acid, ethoxybenzoic acid, phenoxyacetic acid, p-chlorophenoxyacetic acid, 2,4 - dichlorophenoxyacetic acid, 2,4,5-trichlorophenoxyacetic acid, 5-chlorofuroic acid, 5-methylfuoric acid, 5-bromofuroic acid, 4-bromophenoxyacetic acid, 4-methylphenoxyacetic acid, 4-methoxyphenoxyacetic ,4-t.-butylphenoxyacetic acid, 5-t.-butylfuroic acid, furoic acid and phenoxypropionic acid.

By the use of these esters, the frequency of administration can be greatly reduced while providing adequate hormone activity.

The compounds of our invention fall within the following general formula:

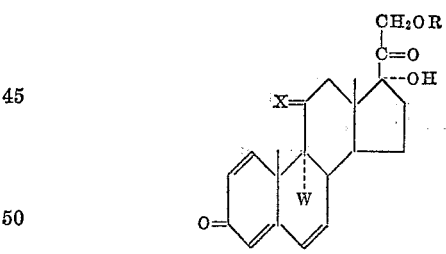

wherein
X is O or

R is H or acyl;
W is F, Cl, or Br.

With reference to the acyl group at the 21-position, while the lower alkanoyl groups are generally preferred, any suitable pharmaceutically acceptable acyl group may be present at such position, such as the acyl groups of the acids hereinabove named.

Our new compounds are prepared by halogenation, preferably bromination, and dehydrohalogenation of the corresponding pregnanes, 4-pregnenes and 1,4-pregnadienes, usually with a protective ester grouping at the 21- position. The preparation of the compounds is illustrated by way of example in the following reaction schemes:

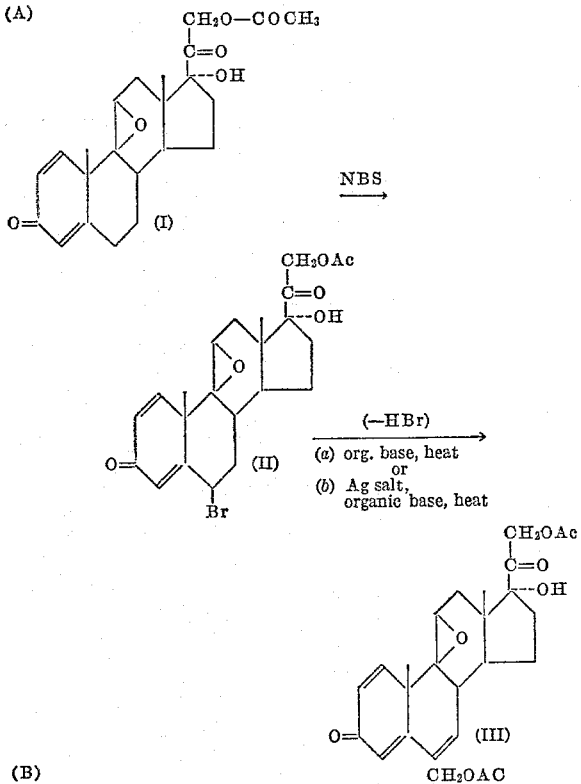

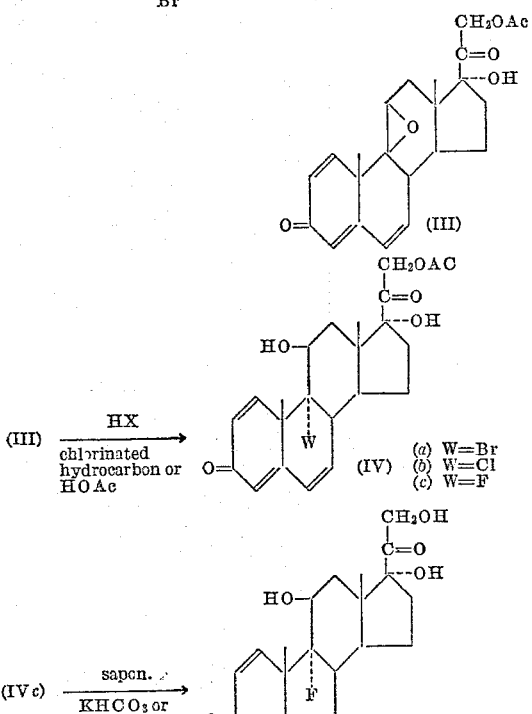

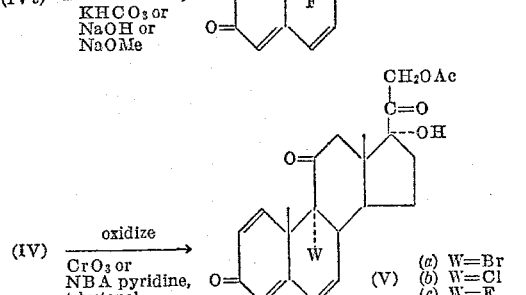

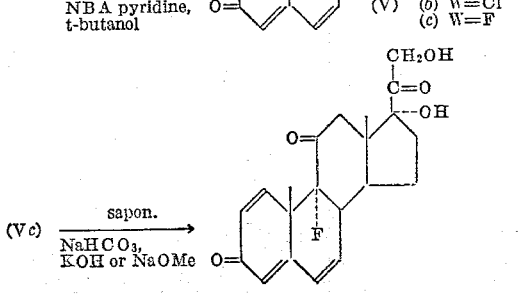

In the above equations, Ac stands for an acyl group, specifically actyl; and NBS is N-bromosuccinimide.

Procedure A converts (I) to the 6-bromo derivative (II), which is then dehydrobrominated to produce (III). On reacting the latter with a hydrohalic acid (Equation B), the 9α-halo-11β-OH derivative of the triene (IV) is obtained. Saponification of (IV) yields the free 21-alcohol (Equation C); while oxidation of the 11β-hydroxyl produces the 21-ester of the 9α-halo derivative of 1,6-bis-dehydrocortisone (V, Equation D), which can be saponified to the free 21-alcohol (Equation E).

While the use of collidine is generally preferred for effecting dehydrohalogenation, other organic bases, preferably tertiary bases, can be employed, like pyridine and bases having a boiling point above that of pyridine, like dimethylaniline, diethylaniline, quinaldine, 2,4- and 2,6-lutidine and quinoline, and mixtures of these bases with high boiling hydrocarbons, such as xylenes, cumenes, and the like.

As above indicated, the esters are preferably those of the lower fatty acids; however, other acids or their anhydrides or chlorides can be employed equally well for effecting esterification of the hydroxyl groups at the 11- and 21-positions. As is known, the 11β-esters of acetic acid and its higher homologues are difficult to form and also difficult to hydrolyze. However, the 11β-formate can be easily formed and easily hydrolyzed, and, as we have found, the same is true of the 11β-trifluoroacetate.

The present invention accordingly provides a process for the manufacture of therapeutically active pregnatrienes in which, in its broader aspect, derivatives of pregnane, 4-pregnene and 1,4-pregnadiene, all similarly substituted by the groups 9α-W-11-X-17α-ol-21-OR-3,20-dione, or 9,11-oxido-17α-ol-21-OR-3,20-dione, wherein R, W and X have the significance indicated above, are reacted with a brominating agent, such as bromine or an N-bromo saturated aliphatic acid amide, such as N-bromo-acetamide or N-bromo-succinimide, to introduce bromine at least at the 6-position (in the case of the 1,4-diene starting compound), or additionally at other positions (in the case of the pregnene and pregnane compounds), followed by dehydrobromination to introduce three, two or one double bond, respectively, into the starting compound to form the pregnatriene. The 9,11-oxido-1,4,6-pregnatrienes are additionally reacted with hydrogen fluoride, chloride or bromide, to produce the 9α-halo-11β-hydroxy compounds.

The 1,4,6-pregnatriene-17α,21-diol-3,11,20-trione and 1,4,6-pregnatriene-11β,17α,21-triol-3,20-dione (and their 21-esters), i.e., the 1,4,6-trienes, corresponding to cortisone and hydrocortisone and their esters, have superior corticoid activity of the order of that of 1-dehydrocortisone and 1-dehydrocortisol, particularly with respect to anti-inflammatory activity, which is 3 to 5 times that of cortisone itself. Anti-inflammatory corticoids are known to depress the eosinophil level in blood and we have found that 1,4,6-pregnatriene-11βα,17α,21-triol-3,20-dione in a dose only one-fourth that of cortisone, causes eosinopenia equal to that of cortisone. It is also known that anti-inflammatory corticoids cause increased deposition of glycogen in the liver. We have found that 1,4,6-pregnatriene - 17α,21-diol-3,11,20-trione, as the 21 - acetate, causes glycogen deposition to the extent of four times that of cortisone, a greater effect than that obtainable with 1,4-pregnadiene-17α,21-diol-3,11,20-trione, which only has three times the effect of cortisone in this test. Our pregnatrienes have, therefore, a hormonal and anti-arthritic effect equal to or greater than that of 1-dehydrocortisone and -cortisol. Because of their potent effect on sodium retention, the 9α-halo pregnatrienes are especially useful in treating Addison's disease and in maintaining adrenalectomized patients.

The high order of activity of our new compounds is all the more surprising when the effect is examined of introducing a 6,7-double bond into cortisone to obtain 4,6-pregnadiene-17α,21-diol-3,11,20-trione. This latter substance has been known for some time [Mattox and Kendall, J. Biol. Chem., 197, 261 (1952)], and study of its physiological properties has revealed that, relative to cortisone, it has: (1) a decreased eosinopenic effect, (2) a decreased effect on involution of the thymus gland, (3) a decreased ability to cause glycogen deposition, and (4) a decreased anti-inflammatory action. All of these effects have served as useful indications of the value of corticoids as anti-arthritic substances, and in each case the 4,6-diene has ½ or less of the activity of cortisone.

Furthermore, we have found that the pregnatrienes of our invention have certain differences in physiological action over the known gluco-corticoids which further distinguish them from the known compounds. In particular, it has been observed that cortisone, cortisol, 1-dehydrocortisone and 1-dehydrocortisol, all of the glucocorticoids presently used for the treatment of arthritis, cause loss of proteinaceous colloid from the thyroid gland. This is in line with the known protein catabolic effect of these hormones which is conceded to be an undesirable side-effect. Our new compounds, on the other hand, surprisingly retain the desirable anti-arthritic properties of the presently used hormones, but are practically devoid of this undesirable catabolic action, as they do not cause loss of proteinaceous colloid from the thyroid gland.

Satisfactory procedures for the preparation of the pregnatrienes of our invention are described in detail by way of illustration in the following examples:

EXAMPLE 1

A. 2,6-Dibromo-4-Pregnene-17α,21-Diol-3,11,20-Trione 21-Acetate

Ten g. of cortisone acetate are dissolved in 75 ml. of methylene chloride and 50 ml. of acetic acid. To this stirred solution are added 8.2 g. of bromine in 25 ml. of acetic acid, the bromine solution being added gradually as the color disappears. After the addition is completed, stirring is continued for thirty minutes, the mixture is concentrated in vacuo and then poured into water. The separated and dried precipitate is the desired dibromide, M.P. 125–130° (dec.), E max. at 242 mμ, (α)$_D$ +80 (dioxane).

B. 1,4,6-Pregnatriene-17α,21-Diol-3,11,20-Trione 21-Acetate 3-Semicarbazone

Ten g. of the dibromide prepared as above are dissolved at 60° in 150 ml. of tert.-butyl alcohol and 120 ml. of alcohol-free chloroform under an atmosphere of carbon dioxide. To this are added 4.5 g. of semicarbazide base and the mixture is stirred two hours at 60°. The solvent is then evaporated to remove chloroform and the residual solution is poured into water. The dried precipitate is the trienetrione semicarbazone, M.P. 185–190° (dec.), U.V. max. at 310 mμ.

C. 1,4,6-Pregnatriene-17α,21-Diol-3,11,20-Trione 21-Acetate

One g. of the trienetrione semicarbazone is dissolved by stirring in 30 ml. of concentrated hydrochloric acid and 100 ml. of water under a nitrogen atmosphere at about 20° C. Then 0.275 g. of sodium nitrite in 5 ml. of water is added over 15 minutes, avoiding excessive ebullition. The mixture is stirred one-half hour more and 1 g. of urea is added and stirred 15 minutes. The reaction is then neutralized by the addition of 10% sodium hydroxide solution and filtered. The filter cake and mother liquor are extracted with methylene chloride, and the solution is chromatographed on magnesium silicate. The fraction eluted with 5% methylene chloride in ether contains the desired product which crystallizes on evaporation of the solvent, U.V. max. at 225, 257, and 299 mμ.

D. 1,4,6-Pregnatriene-17α,-21-Diol-3,11,20-Trione

A sample of 0.1 g. of the product of procedure C is dissolved in 1 ml. of chloroform and 4 ml. of methanol. To this are added 0.4 ml. of water and 0.2 ml. of concentrated hydrochloric acid at 20° C. The mixture is diluted with water after two days and extracted with chloroform. Evaporation of the chloroform solution gives the crystalline free diol product.

EXAMPLE 2

A. 2,2,4,6-Tetrabromo-4-Pregnene-11β,17α,21-Triol-3,20-Dione 11-Formate 21-Acetate Ten g. of pregnane-11β,17α,21-triol-3,20-dione 11-formate 21-acetate (M.P. 209–212° C.) is dissolved in 50 ml. of methylene chloride and 20 ml. of acetic acid. To this is added over one-half hour a solution of 7.4 g. of bromine in 20 ml. of methylene chloride as the solution decolorizes. Then the reaction is irradiated with a 500 watt photoflood lamp, and over a period of one hour a solution of 11.1 g. of bromine in 20 ml. of acetic acid is added. After additional irradiation or three hours' duration, the mixture is allowed to stand overnight. The solution is washed thrice with water, dried and evaporated to a resin. Crystallization from acetone-methanol gives the desired tetrabromo formate acetate, M.P. 100–110° (dec.).

B. 2,4-Dibromo-1,4,6-Pregnatriene-11β,17α,21-Triol-3,20-Dione 11-Formate 21-Acetate To 25 ml. of refluxing collidone are added 5 g. of the tetrabromo formate acetate and the mixture is refluxed with stirring for one hour. The mixture is cooled, poured into excess dilute sulfuric acid and ice, and the oily suspension is extracted with methylene chloride, washed with water and dried. The solution is chromatographed on magnesium silicate and elution with ether separates the desired dibromo triene.

C. 1,4,6-Pregnatriene-11β,17α,21-Triol-3,20-Dione 11-Formate 21-Acetate

Two g. of the product of Example 2B are dissolved in 5 ml. of ethylene chloride and 5 ml. of acetic acid and stirred with 2 g. of zinc dust for thirty minutes. The filtered solution is evaporated to a resin, and the crude product is purified by chromatography on magnesium silicate. The fraction eluted with ether contains the desired product.

D. 1,4,6-Pregnatriene-11β,17α,21-Triol-3,20-Dione

A sample of 0.5 g. of the formate acetate of Example 2C is dissolved in 10 ml. of methanol and nitrogen is bubbled through. The solution is stirred and a solution of 0.14 g. of potassium hydroxide in 3 ml. of water is added dropwise over three hours. The mixture is then stirred overnight at room temperature. The solution is diluted with water, extracted with methylene chloride, washed with water, dried and chromatographed on magnesium silicate. The fraction eluted with 2% methanol in benzene is evaporated and the residue crystallized from dilute acetone to give the desired product, M.P. 238–242° C. (dec.).

EXAMPLE 3

A. 2,6-Dibromo-9α-Fluoro-4-Pregnene-11β,17α,21-Triol-3,20-Dione 21-Acetate

A sample of 0.5 g. of 9α-fluoro-4-pregnene-11β,17α,21-triol-3,20-dione 21-acetate (M.P. 230–232°) is dissolved in 50 ml. of chlorobenzene and 50 ml. of carbon tetrachloride is added containing 0.2 g. of pyridine. After water is removed by boiling, the solution is treated with 0.47 g. of N-bromosuccinimide and the mixture is boiled by heating with a 500 watt bulb about 20 min. until a negative test with starch-iodide paper shows the reagent is consumed. The cooled solution is washed with water, dried and evaporated. The residue is crystallized from benzenehexane to give the desired product.

B. *9α-Fluoro-1,4,6-Pregnatriene-11β,17α,21-Triol-3,20-Dione 21-Acetate*

A sample of 0.3 g. of the product of Example 3A is treated with 0.12 g. of 2,4-dinitrophenyl hydrazine and 0.10 g. of anhydrous sodium acetate and the mixture is stirred two days at room temperature with 30 ml. of acetic acid. The mixture is then poured into water and the crude dinitrophenyl-hydrazone of the desired product is filtered off.

The hydrazone is then treated as in Example 1C with 110 mg. of sodium nitrite and dilute hydrochloric acid. The desired product is isolated by chromatography as in Example 1C, eluting with 2% methanol in methylene chloride.

C. *9α-Fluoro-1,4,6-Pregnatriene-11β,17α,21-Triol-3,20-Dione*

A sample of 0.1 g. of the product of Example 3B is hydrolyzed as in Example 1D. Chromotography yields the desired product which is crystallized from dilute acetone.

EXAMPLE 4

A. *2,6-Dibromo-9α-Fluoro-4-Pregnene-17α,21-Diol-3,11,20-Trione 21-Acetate*

A sample of 1 g. of 9α-fluoro-4-pregnene-17α,21-diol-4,11,20-trione 21-acetate is treated, as in Example 1A, with 0.40 g. of bromine to give the 2,6-dibromo-derivative.

B. *9α-Fluoro-1,4,6-Pregnatriene-17α,21-Diol-3,11-20-Trione 21-Acetate*

A sample of 1 g. of the product of Example 4A is dehydrobrominated as in Example 2B in 15 ml. of boiling collidine. Chromatography separates the desired product which is eluted with ether.

C. *9α-Fluoro-1,4,6-Pregnatriene-17α,21-Diol-3,11,20-Trione*

A sample of 0.1 g. of the last-named product (Example 4B) is saponified as in Example 2D with 50 mg. of potassium bicarbonate. The residue is crystallized from acetone to give the desired product.

EXAMPLE 5

*9α-Fluoro-1,4-Pregnadiene-11β,17α,21-Triol-3,20-Dione*

A sample of 0.2 g. of the material obtained as in Example 3C is hydrogenated by dissolving it in 40 ml. of ethylacetate and shaking with 0.10 g. of 10% palladium on carbon in a hydrogen atmosphere until 10.5 cc. of hydrogen have been absorbed. Crystallization of the residue from aqueous methanol gives the diene product, M.P. 247–250°.

EXAMPLE 6

A. *6-Bromo-9β,11β-Oxido-1,4-Pregnadiene-17α,21-Diol-3,20-Dione 21-Acetate*

Two g. of 9β,11β-oxido-1,4-pregnadiene-17α,21-diol-3,20-dione 21-acetate (see J. Fried et al., J. Am. Chem. Soc. 77, 4181 (1955)), is dissolved by boiling in 100 ml. of chlorobenzene and 50 ml. of carbon tetrachloride and the solution is dried by distilling off 5 ml. of solvent. To the solution is added 0.93 g. of N-bromosuccinimide and the mixture is irradiated with a 300-watt photoflood lamp while refluxing for 15 minutes as succinimide crystallizes out. The mixture is cooled and washed with water, and the organic solution is dried, filtered and evaporated in vacuo to a residue of 6-bromo-9β,11β-oxido-1,4-pregnadiene-17α,21-diol-3,20-dione 21 - acetate. The ultraviolet spectrum has λ max.=249 mμ.

B. *9β,11β-Oxido-1,4,6-Pregnatriene-17α,21-Diol-3,20-Dione 21-Acetate*

To 15 ml. of refluxing dry γ-collidine is added 0.5 g. of the product of Example 6A. After 30 minutes' boiling, during which solid matter precipitates, the mixture is cooled, poured into ice and water and the pH adjusted to 4–6 with dilute hydrochloric acid. The mixture is extracted three times with 25 ml. of methylene chloride, and the solution is washed with water, dried, filtered and evaporated to dryness.

The residue is dissolved in a minimum of methylene chloride and chromatographed on activated magnesium silicate, using hexane to develop the column. The fraction eluted with 70% ether in hexane is the desired 9β,11β - Oxido - 1,4,6 - pregnatriene - 17α,21 - diol - 3,20-dione 21 acetate, which may be crystallized further from acetone-hexane. The ultraviolet spectrum has γ max.=223, 255, 297 mμ

C. *9α-Fluoro-1,4,6-Pregnatriene-11β,17α,21-Triol-3,20-Dione 21-Acetate*

A sample of 0.2 g. of the product of Example 6B is dissolved in 10 ml. of alcohol-free chloroform, chilled to 0° and treated with 0.1 g. of anhydrous hydrogen fluoride. The solution is maintained at 0° for 5 hours, and washed with dilute sodium bicarbonate and water till neutral. The dried solution is filtered and evaporated to a residue which is crystallized from methylene chloride-hexane to give 9α-fluoro-1,4,6-pregnatriene-11β,17α,21-triol-3,20-dione 21-acetate. The ultraviolet absorption maxima are at 222, 254, 298 mμ.

EXAMPLE 7

*9α-Bromo-1,4,6-Pregnatriene-11β,17α,21-Triol-3,20-Dione 21-Acetate*

Example 6C is repeated using hydrogen bromide in place of hydrogen fluoride. The product obtained on crystallization of the residue from acetone-hexane is 9α-bromo - 1,4,6 - pregnatriene - 11β,17α,21 - triol - 3,20-dione 21-acetate.

EXAMPLE 8

*9α-Chloro-1,4,6-Pregnatriene-11β,17α,21-Triol-3,20-Dione 21-Acetate*

Example 6C is repeated using hydrogen chloride instead of hydrogen fluoride. The product obtained on crystallization of the residue from acetone-hexane is 9α-bromo - 1,4,6 - pregnatriene - 11β,17α,21 - triol - 3,20-dione 21-acetate.

EXAMPLE 9

*9α-Fluoro-1,4,6-Pregnatriene-11β,17α,21-Triol-3,20-Dione*

A sample of 0.1 g. of the product of Example 6C is saponified under nitrogen using 26 mg. of potassium bicarbonate in 5 ml. of 95% methanol for eighteen hours.

The water-precipitated product is further crystallized from aqueous methanol to give 9α-fluoro-1,4,6-pregnatriene-11β,17α,21-triol-3,20-dione.

EXAMPLE 10

*9α-Fluoro-1,4,6-Pregnatriene-17α,21-Diol-3,11,20-Trione 21-Acetate*

A sample of 0.2 g. of the product of Example 6C is dissolved in 5 ml. of acetic acid, stirred and treated with a solution of 32 mg. of chromic anhydride in 0.1 cc. of water to which 0.4 cc. of acetic acid is added. The solution is stirred 15 minutes, treated with methanol, stirred 30 minutes longer, and poured into water. The precipitate is collected, dried and recrystallized from acetone-hexane to give 9α-fluoro-1,4,6-pregnatriene-17α,21-diol-3,11,20-trione 21-acetate. The ultraviolet spectrum has λ max.=222, 255, 296 mμ.

EXAMPLE 11

*9α-Bromo-1,4,6-Pregnatriene-17α,21-Diol-3,11,20-Trione 21-Acetate*

The product from Example 7 (0.1 g.) is treated as in Example 10 with 15 mg. of chromic anhydride in 0.2 ml. of 75% acetic acid. The precipitate is crystallized from methylene chloride-hexane to give 9α-bromo-1,4,6-pregnatriene-17α,21-diol-3,11,20-trione 21-acetate.

EXAMPLE 12

*9α-Chloro-1,4,6-Pregnatriene-17α,21-Diol-3,11,20-Trione 21-Acetate*

A sample of 0.2 g. of the product of Example 8 is treated as in Example 10 with 31 mg. of chromic anhydride in 0.5 ml. of 80% acetic acid. The product is crystallized from aqueous acetone to give 9α-chloro-1,4,6-pregnatriene-17α,21-diol-3,11,20-trione 21-acetate.

EXAMPLE 13

*9α-Fluoro-1,4,6-Pregnatriene-17α,21-Diol-3,11,20-Trione*

A sample of 0.1 g. of the product of Example 10 is saponified as in Example 9. The product is purified by crystallization from aqueous acetone to give 9α-fluoro-1,4,6-pregnatriene-17α,21-diol-3,11,20-trione.

The therapeutically active pregnatrienes may be administered by mouth in the form of tablets containing, for example, from 1 to about 50 or more mg. per tablet mixed with a solid non-toxic pharmaceutical carrier containing one or more of the usual ingredients, such as starches, sugars, gums, gelatins, soaps, clays, calcium and magnesium carbonates, aluminum hydroxide, and the like. They may, however, be also administered by subcutaneous or intramuscular injection, dissolved or suspended in a suitable non-toxic liquid vehicle; or they can be administered in the solid form by subcutaneous implantation, or in the form of suppositories dissolved or suspended in a fatty or waxy vehicle which melts at approximately body temperature. They can also be administered topically in the form of an ointment or cream in which they are dissolved or suspended in an unguent or cream base of known composition; and they may also be employed in the form of ointments and aqueous suspensions for ophthalmic use. The compounds in microcrystalline form in aqueous suspensions can be used for intra-articular injection and also as nasal sprays; while infusions can be prepared for intravenous use.

Because of their anti-inflammatory or glucocorticoid activity, all of our compounds are especially useful in the form of lotions, ointments, and the like, in the topical treatment of skin irritations and rashes, such as pruritis of the mucosal surfaces, allergic dermatoses and similar diseases.

We claim:

1. A composition of matter selected from the group consisting of 11-keto and 11β-hydroxy-9α-halo-$\Delta^4$-pregnenes wherein the halo group is a halogen atom having an atomic number less than that of iodine, said pregnenes having a keto group at the 3- and 20-positions, a hydroxy group at the 17α-position, a member of the group consisting of hydroxyl and aliphatic acyloxy having up to 12 carbon atoms at the 21-position and characterized by the presence of a double bond in each of the 1- and 6-positions.

2. 9α-halo-1,4,6 - pregnatriene -11β,17α,21 - triol - 3,20-dione wherein the halo group is a halogen atom having an atomic number lower than that of iodine.

3. 9α-halo-1,4,6-pregnatriene-17α,21-diol-3,11,20-trione wherein the halo group is a halogen atom having an atomic number lower than that of iodine.

4. A 21-aliphatic acyl ester of a compound of claim 2 wherein the aliphatic acyl group has up to 12 carbon atoms.

5. A 21-aliphatic acyl ester of a compound of claim 3 wherein the aliphatic acyl group has up to 12 carbon atoms.

6. 9α-fluoro-1,4,6-pregnatriene-11β,17α,21 - triol - 3,20-dione 21-acetate.

7. 9α - bromo-1,4,6-pregnatriene-11β,17α,21-triol-3,20-dione 21-acetate.

8. 9α-chloro-1,4,6-pregnatriene-11β,17α,21 - triol - 3,20-dione 21-acetate.

9. 9α - fluoro-1,4,6 - pregnatriene-11β,17α,21-triol-3,20-dione.

10. 9α-chloro-1,4,6-pregnatriene-17α,21-diol-3,11,20-trione 21-acetate.

11. A therapeutic composition comprising a pregnatriene compound as defined in claim 1, mixed with a non-toxic pharmaceutical carrier.

12. A therapeutic composition as defined in claim 11 in unit dosage form, wherein each dosage unit contains from 1 mg. to about 50 mg. of the pregnatriene.

References Cited in the file of this patent

UNITED STATES PATENTS

| | | |
|---|---|---|
| 2,341,250 | Wallis et al. | Feb. 8, 1944 |
| 2,563,247 | Kendall et al. | Aug. 7, 1951 |
| 2,590,978 | Kendall et al. | Apr. 1, 1952 |
| 2,602,804 | Kendall | July 8, 1952 |
| 2,606,913 | Levin et al. | Aug. 12, 1952 |
| 2,684,376 | Oliveto et al. | July 20, 1954 |
| 2,705,237 | Djerassi et al. | Mar. 29, 1955 |
| 2,730,525 | Hogg et al. | Jan. 10, 1956 |
| 2,736,734 | Sarett | Feb. 28, 1956 |
| 2,752,339 | Julian et al. | June 26, 1956 |
| 2,763,671 | Fried et al. | Sept. 18, 1956 |
| 2,768,189 | Nomine et al. | Oct. 23, 1956 |
| 2,768,191 | Watnant et al. | Oct. 23, 1956 |
| 2,783,226 | Gould et al. | Feb. 26, 1957 |
| 2,788,353 | Djerassi et al. | Apr. 9, 1957 |
| 2,788,354 | Agnello et al. | Apr. 9, 1957 |
| 2,789,117 | Sarett | Apr. 16, 1957 |

OTHER REFERENCES

Jour. Am. Chem. Soc., vol. 72, pages 4531–4539 (1950).